United States Patent [19]

Vliet

[11] 4,104,778

[45] Aug. 8, 1978

[54] METHOD AND APPARATUS FOR FASTENER TENSIONING

[75] Inventor: Walter Carl Vliet, Landing, N.J.

[73] Assignee: Ingersoll-Rand Company, Woodcliff Lake, N.J.

[21] Appl. No.: 762,988

[22] Filed: Jan. 27, 1977

[51] Int. Cl.[2] .................... B23Q 5/00

[52] U.S. Cl. .................... 29/407; 73/88 F; 173/12

[58] Field of Search .................... 73/88 F, 139; 29/240, 29/407; 81/52.4 R, 52.4 B, 52.5; 173/1, 12

[56] References Cited

U.S. PATENT DOCUMENTS

| | | | |
|---|---|---|---|
| 2,756,622 | 7/1956 | La Belle | 73/139 |
| 4,013,895 | 3/1977 | Akiyoshi et al. | 73/139 X |

*Primary Examiner*—Charles A. Ruehl
*Attorney, Agent or Firm*—Walter C. Vliet

[57] ABSTRACT

A fastener tensioning method and apparatus for obtaining a desired degree of tension in a fastener. The apparatus includes a means for applying rotation to a fastener, a means for measuring the torque applied by the means for rotating the fastener, a means for determining a rate of change of torque applied to the fastener with respect to the rotation applied to the fastener, a means for detecting when the rate of change of torque with respect to rotation becomes a constant, a means for accomplishing a desired amount of rotation of the fastener beyond the rotation required to achieve the constant rate of change of torque with respect to rotation, and a means for shutting off the means for applying rotation to the fastener in response to the total desired rotation being achieved. The embodiment herein described improves the well-known "turn of the nut" method for fastener tensioning by providing that method with a well determined starting point.

7 Claims, 2 Drawing Figures

METHOD AND APPARATUS FOR FASTENER TENSIONING

BACKGROUND OF THE INVENTION

The trend toward optimizing equipment design to achieve the maximum capability of equipment with relationshp to weight, size, and economy of material usage have spurred considerable activities in the area of fastener tension and inspection methods. A considerable amount of the early development work centered on torque control as a means of fastener tension. However, the accuracy of this method is severely limited by its sensitivity to such factors as thread condition and other factors affecting the coefficient of friction.

To minimize the effect of friction, a later development, often referred to as the so-called "turn of the nut" method, was evolved. The method prescribed a combination of torque (to assure the fastener was seated) and rotation (using the thread of the bolt as a micrometer to stretch the bolt). This method achieves considerable accuracy in tensioning the bolt under carefully controlled fastener and joint system conditions. However, the torque controlled starting point often leads to difficulties by false starts (the fastener or the joint system not properly seated or because of thread condition causing high prevailing torque).

An even more recent development is the method of bringing the bolt to its recognizable yield point (a well-defined point of tension) and utilizing that point to ultimately arrive at the desired bolt tension either by memory of the tightening cycle or an "unturn of the nut" method. While these later methods result in reasonably accurate bolt tension, the methods have some draw backs in universal application. In many applications, it is not desirable to bring the fastener to its yield point. The joint may not be capable of sustaining the full tension of a yielded fastener without damage such as flange warpage, gasket crushing, or thread failure.

SUMMARY OF THE INVENTION

The purpose of the present invention is to provide a novel method and simple apparatus for tensioning a fastener which utilizes a definable point in the bolt tensioning sequence below the yield point. In the embodiment described herein, the definable point is utilized as a starting point for rotation to obtain the accurate tensioning of the fastener utilizing its threads as a micrometer to stretch the fastener a proportionately determined amount.

The embodiment is intended as an improvement of the socalled "turn of the nut" method wherein the starting point is more accurately determined by utilizing the joint characteristics. It is the further purpose of this invention to eliminate the variables of the joint and fastener torquing sequence occurring prior to the linear portion of the torque rotation slope and the unique starting point of the present invention. It is yet another purpose of this invention to eliminate the need for driving a fastener to its yield point to establish a well-defined point in fastener tension from which fastener tension levels may be predicted and achieved.

It is a further object of this invention to minimize the torque power required to achieve a desired level of fastener tension by avoiding the overtightening of the fastener prior to achieving the desired level of fastener tension. These and other objects are accomplished by an apparatus comprising: Means for rotating and applying torque to a threaded fastener; means for measuring the rotation of the fastener; means for measuring the torque applied to the fastener; means for detecting the rate of change of the torque applied to the fastener with respect to the rotation applied to the fastener; means for detecting when the rate of change of torque applied to the fastener with respect to the rotation becomes a constant; means for accomplishing a predetermined amount of rotation of the fastener beyond the rotation required to achieve the constant rate; and means for shutting off the means for applying rotation to the fastener in response to the predetermined amount of rotation being achieved.

DESCRIPTION OF THE PREFERRED EMBODIMENT

Figure 1:
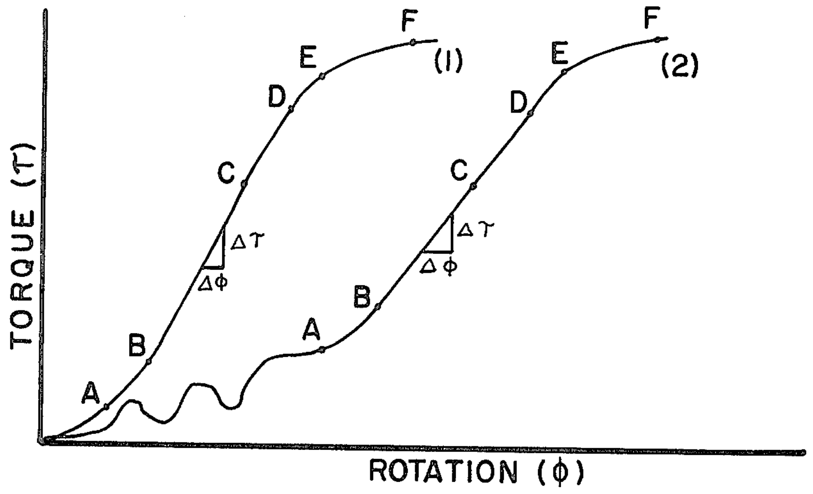
FIG. 1 is a graph showing various typical plots of torque versus rotation for several fastener tensioning sequences.

Reference is made to FIG. 1 which shows a series of typical joint torquing sequences. Curve 1 is typical of a well-prepared hard joint, in this case the initial torque build up is relatively rapid and constant once established. Of course, the curve could be displaced significantly to the left depending on the length of the fastener and the rotation required to engage the head of the fastener. Curve 2 is typical of a fastener wherein the joint is softer than curve 1 and the threads or the joint itself exhibits erratic torquing during initial tightening. This is created in typical cases by poor or dirty threads, high spots in the bolt fact or local yielding of the joint system.

For example, the change in rate may result from a soft sealing gasket which bottoms, initial yielding taking place in the joint or thread yielding creating a false linear gradient. One thing, however, appears common to each of these torquing sequences; at some point each enters a relatively linear portion during which the stress in the bolt is considered proportional to the strain in the bolt, and the strain is proportional to the rotation of the thread. For each of the curves, several points have been identified for purposes of further discussion. Point A is the point at which the rotation has progressed until the joint is just snug; that is, all of the erratic portions or clearances in the joint have been eliminated and further rotation of the fastener will result in appreciable increase in the torque and tension level experienced in the fastener. Point B is the point at which the fastener is entering at its proportional range in tension. Point C is an arbitrary intermediate check point, or points, for the purpose of this invention. Point D is the point at which torque or rotation on the bolt yields the desired bolt tension. Point E is the end of the proportional range sometimes referred to as the yield point. Point F is a point at which the bolt is experiencing nonelastic deformation.

It will be noted that in each case of the typical joint tightening sequence, the curve presented for torque versus rotation exhibits a relatively constant slope for at least a portion of the tightening cycle; that is $(\Delta\tau/\Delta\phi)$ (increment of torque per increment of rotation) beomces a constant K. If a relatively constant speed driver is utilized, time may be substituted for the parameter of rotation. Other tension associated parameters other than torque may also be utilized. However, the preferred embodiment herein described will utilize torque as the tension-related parameter because of its relatively common and convenient use for fastener tensioning.

In the past, there have been several attempts as previously described to improve the relationship between applied torque and resulting tension. In U.S. Pat. No. 3,962,910, Spyridakis, et al, several inspection methods are described which improve the reliability of torque as a tension-related parameter. In the method of that patent, if certain predetermined levels of torque occur within predetermined ranges of rotation for a given fastener, after an arbitrarily specified seating torque, then the joint tightening system can be assumed to be operating satisfactorily and a reasonable tension level achieved in the fastener. The system, however, requires predetermination of the acceptable range of torque and/or the range of rotation and further assumes a reasonable tension level is achieved within these ranges. The method, however, cannot be utilized to predict a desired tension level relative to the varying friction and joint conditions encountered in typical fastener applications.

U.S. Pat. No. 3,643,501, Pauley, introduced a method of determining the yield point of a fastener as it is rotated. This provided a useful gage of fastener tension, in that the yield point of the fastener results from a well-defined level of tension in the fastener. This parameter has been utilized in several fastener tension systems as both the final point of tensioning and the starting point for achieving other levels of fastener tension. As previously mentioned, however, this system has the disadvantage of requiring that the fastener and its joint first be stressed to the yield point of the fastener, which in some cases, is not desirable.

This invention provides an alternative means of determining fastener tension levels and may be utilized to achieve any level of fastener tension desired with improved accuracy over previous "turn of the nut" methods. In this invention, I propose the use of the initial entry to the linear portion of the fastener torque (tension-related parameter) and rotation curve. Apparatus capable of determining the change of slope of the torque-rotation curve, and apparatus for measuring torque and rotation are now well-known in the art.

Figure 2:
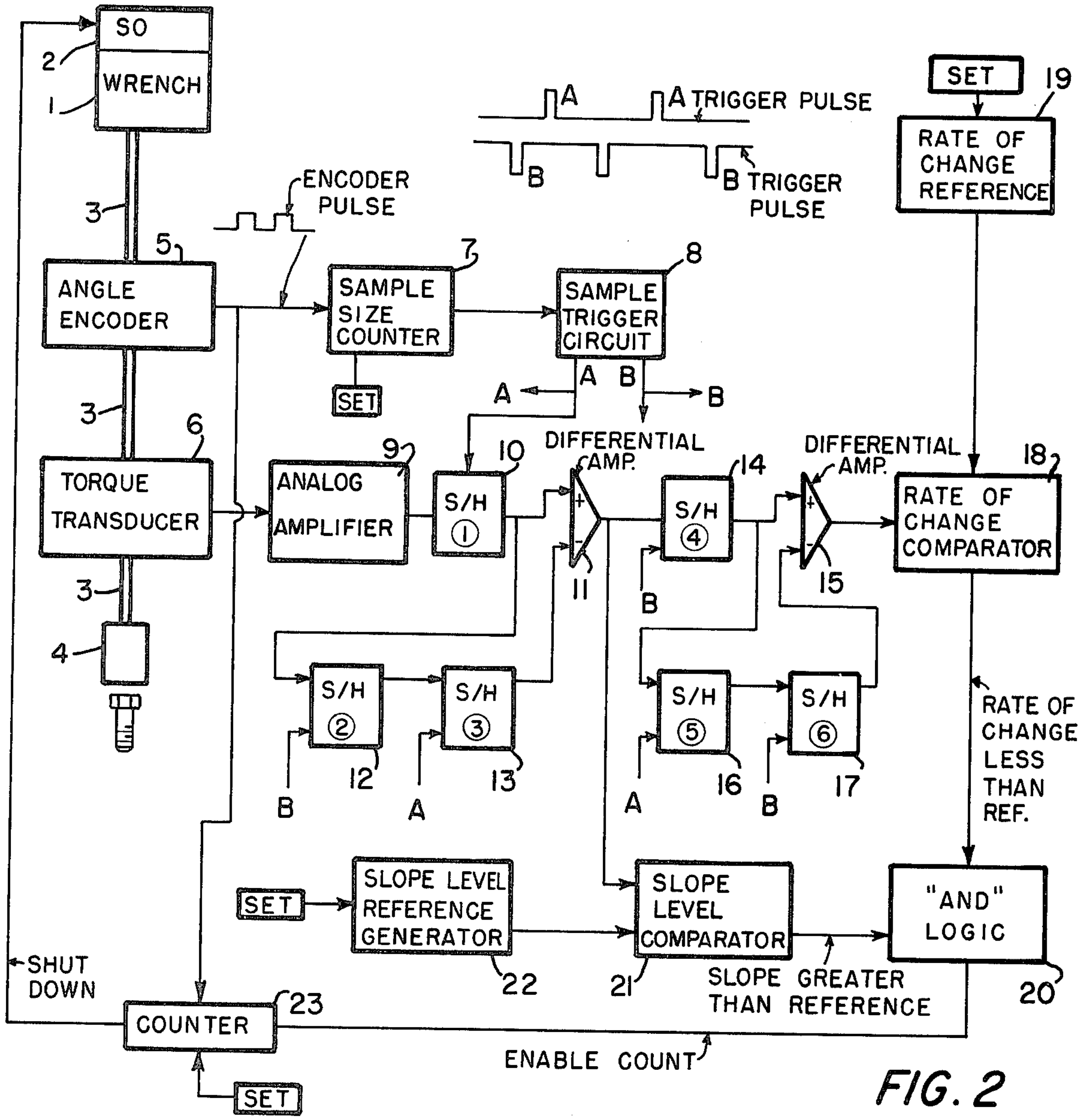
FIG. 2 is a schematic showing the apparatus necessary to accomplish a preferred embodiment of the invention, wherein the slope gradient is utilized to establish a starting point in an improvement of the "turn of the nut" method.

Referring now to FIG. 2 which shows a block diagram for the circuit logic for the embodiment of this invention. The system is comprised of a power wrench or nut runner generally identified by reference numeral 1. The wrench is provided with a shut-off valve 2. The wrench has its power output on a spindle 3 which rotates a socket 4 for driving a typical threaded fastener. The output of the power wrench is monitored by an angle encoder 5 which converts the rotation of spindle 3 into usable pulse signals. In the preferred embodiment, one pulse is produced for each degree of rotation. The torque level applied to spindle 3 is monitored by torque transducer 6 which creates an analog signal proportional to the torque output.

The angle encoder pulse signals are fed to a sample size counter 7 which counts angle encoder pulse signals and produces an output pulse signal for every predetermined or set total of input pulses. Typically, one pulse may be produced for every 8 input pulses as determined by the joint system to be tensioned.

The output of sample size counter 7 is utilized to produce two repeated trigger pulses. This is accomplished in sample trigger circuit 8 which produces a signal pulse for approximately ½ of the 8 pulse interval. The leading edge of the signal pulse is used to produce a short duration "A" trigger signal while the collapse or trailing edge of the signal pulse is utilized to produce a short duration "B" signal through well-known technology. The "A" and "B" signals are alternately and evenly spaced and are utilized as timing enable signals in both the slope detection and the rate of change of slope logic to be described later.

The output of torque transducer 6 is utilized to determine the slope of the torque rotation curve applied to the fastener as follows: The torque level analog signal is first amplified in analog amplifier 9. The "A" trigger signal is utilized to enable sample and hold circuit 10 to receive and store the output of analog amplifier 9. The sample and hold circuit 10 will constantly supply a signal proportional to the input signal received until it is updated by the next received enable "A" signal. As shown in FIG. 2, the output of sample and hold circuit 10 is fed to both differential amplifier 11 and sample and hold circuit 12. Sample and hold circuit 12 will accept the signal only on an enable command from trigger pulse "B". Sample and hold circuit 12 has its output fed to sample and hold circuit 13 which accepts the signal only on an enable command from trigger pulse "A". The output of sample and hold circuit 13 is fed to a differential amplifier 11.

As can be seen by one skilled in the art, the output of the sample and hold circuit 13 is the torque level output at the previous "A" trigger pulse while the output of sample and hold circuit 10 is for the present "A" trigger pulse. Since the signal output is proportional to the torque rise for an "A" pulse interval and the "A" pulse interval is proportional to rotation, it can be appreciated that the differential signal applied to differential amplifier 11 is the torque differential per interval of rotation or proportional to the slope of the torque rotation curve for the fastener.

A similar technique is utilized to determine the rate of change of the slope of the torque rotation curve. In this case, the output of the differential amplifier 11 (slope) is fed to sample and hold circuit 14 which accepts the output of differential amplifier 11 on a "B" trigger pulse. This is done in order to prevent the signal from being received during the updating of the signals to differential amplifier 11 during the "A" trigger pulse. The output of sample and hold circuit 14 is fed to differential amplifier 15 and also to sample and hold circuit 16 which accepts the signal on an "A" trigger pulse. The output of sample and hold circuit 16 is fed to sample and hold circuit 17 which accepts the signal on a "B" trigger pulse. The output of sample and hold circuit 17 is fed to differential amplifier 15.

In the same manner as described before, it should now be obvious to one skilled in the art that the slope represented by the output of sample and hold circuit 17 is the slope for one preceeding "A" pulse interval. The output of differential amplifier 15, therefore, represents the change in slope for the interval or the rate of change of slope. The output of amplifier 15 is sent to rate of change comparator 18. The signal received from amplifier 15 is an analog level signal which increases or decreases in relation to the rate of change of slope of the torque rotation curve. In the proportional portion of the normal fastener torque rotation curve, this value of this signal will approach zero. For practical reasons, a rate of change analog reference signal circuit 19 is provided and anytime the rate of change of the slope is below the set point value of the reference signal, a signal is sent to "and" logic circuit 20.

The slope output signal of differential amplifier 11 is also fed to slope level comparator 21 where it is compared against a preset slope reference produced by slope reference generator 22. Whenever the slope signal of differential amplifier 11 is greater than the slope reference signal of slope reference generator 22, an analog signal will be produced which is fed to "and" logic 20. Thus, it can be seen that when the rate of change of the slope (output of comparator 18) is below the rate of change reference 19 and the slope is greater than the slope level reference (output of comparator 4), the "and" logic circuit 20 will produce a signal which is fed to counter 23 as an enable function. At this point, counter 23 will begin to receive and count the angular encoder 5 pulse output which is proportional to rotation. When a set point count is exceeded, a shut-down signal is sent to the shut-off valve 2. In this manner, a predetermined rotation is accomplished after the slope of the torque rotation curve is constant and has a preselected minimum value.

Having described in detail the circuit logic for the preferred embodiment, one skilled in the art can appreciate that the nut runner will run the fastener down. During this period, there will be an erratic rise in torque until the fastener is seated and the joint snugged up. At this point, the fastener in the typical case will begin to be elastically deformed at a uniform rate for a given uniform increase in applied load. This results in the typical ($\Delta\tau/\Delta\phi$) constant exhibited for the torque rotation curve (Point B to Point E of FIG. 1). Utilizing the point (Point B of FIG. 1) at which this slope constant K occurs as the starting point for rotating the fastener a further predetermined amount of rotation in a method similar to the so-called "turn of the nut" method will provide an accurate fastener tensioning method having the improvement of a defined starting point as opposed to an arbitrarily preselected torque as utilized by the "turn of the nut" method.

As a further inspection method, the slope constant K may be compared against a predetermined constant, for example at point C, to assure that the fastener system is within a prescribed range of variables including thread condition, thread friction, and gasket hardness.

Utilizing this invention, it is possible then to obtain a desired level of tension in the fastener without the necessity of bringing the fastener to its yield point. With or without appropriate system checks, the fastener may be tightened to any desired level of tension. Utilizing the apparatus of this invention, it is necessary for the user to determine the number of samples of constant slope required to establish the presence of a constant slope and either by theoretical calculation for a given fastener system or by experimental result to determine the desired predetermined rotation. With normal manufacturing tolerances the resulting tension levels in the fastener will be much improved over the tension levels achieved with the prior "turn of the nut" method, and the fastener need not be brought to its yield point to determine a level of tension. In addition, the system apparatus is greatly simplified over that required for yield point detection, especially where a tension level other than that yield is required. In addition, the system will reduce torquing power required and fastener tensioning time, in that the steps of first bringing the fastener to its yield point are avoided.

I have described a unique fastener tensioning system and described in detail an embodiment thereof for purposes of assisting one skilled in the art in understanding the nature of the invention and its use. It will be obvious to one skilled in the art that numerous modifications to the circuit will accomplish similar results. I do not wish to be limited in the scope of my invention by the decribed embodiment. The invention is to be limited only by the scope of the claims.

I claim:

1. A method of threaded fastener tensioning comprising:
- rotating the fastener;
- monitoring the torque and rotation applied to the fastener to determine when the rate of change of torque increase per unit of rotation becomes a constant; and
- rotating the fastener a prescribed rotary angle after said rate of change of torque increase per unit of rotation becomes a constant.

2. An apparatus for threaded fastener tensioning comprising:
- wrench means for rotating a fastener;
- means for measuring the torque and rotation applied to said fastener by said wrench means;
- means for receiving the measurement of torque and rotation;
- means for determining a rate of change of torque per unit of rotation received;
- monitoring means for determining when said rate of change of torque per unit of rotation is constant and creating a signal in response thereto;
- means for applying a predetermined rotary angle to said fastener in response to said signal; and
- shut off means to stop rotation of said fastener in response to said predetermined rotary angle being reached.

3. A method of fastener tensioning comprising:
- rotating the fastener;
- monitoring a first and second input tightening characteristic associated with the tensioning of the fastener and indicative of the proportional range of fastener tensioning;
- determining by means of said first and second input tightening characteristic during the tightening sequence when the rate of change of said first tightening characteristic with respect to said second tightening characteristic becomes a constant thereby determining that said fastener has been rotated to the start of its proportional range; and
- rotating said fastener a further predetermined proportionally determined amount.

4. The method of claim 3 wherein:
- said further proportionally determined amount is a predetermined rotary angle initiated after continuous monitoring of the first and second input tightening characteristics have been determined to have had the fastener first enter into its proportional range of tightening.

5. The method of claim 4 wherein:
- said first input characteristic is torque and said second input characteristic is rotation.

6. The method of claim 3 wherein:
- said first input characteristic is torque and said second input characteristic is time.

7. The method of claim 6 wherein:
- said further proportionally determined amount is a timed additional rotation.

* * * * *